Feb. 8, 1938.   C. H. WHITE   2,107,723
PLANTER
Filed Oct. 25, 1935   2 Sheets-Sheet 1
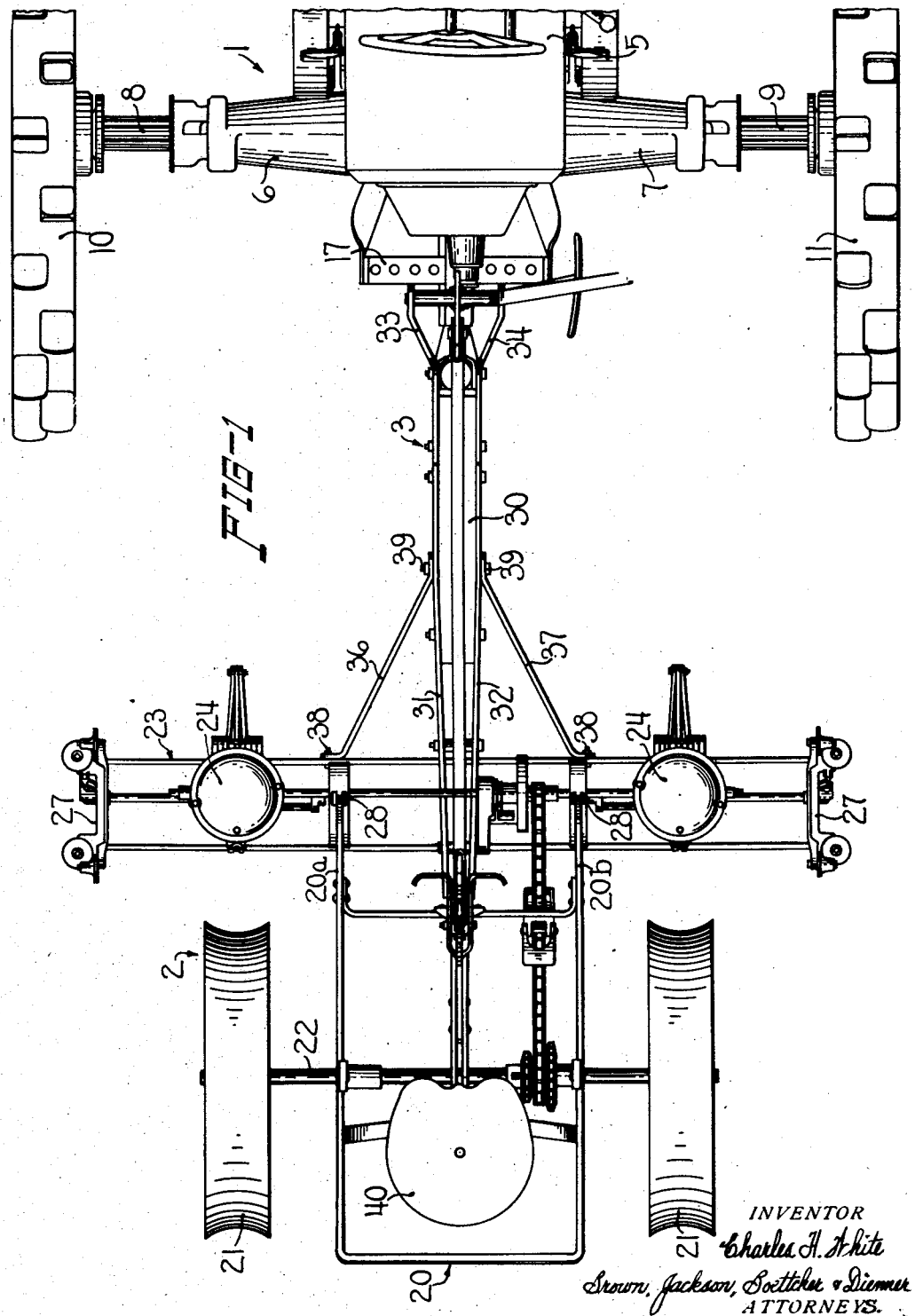
INVENTOR
Charles H. White
Brown, Jackson, Boettcher & Diemer
ATTORNEYS.

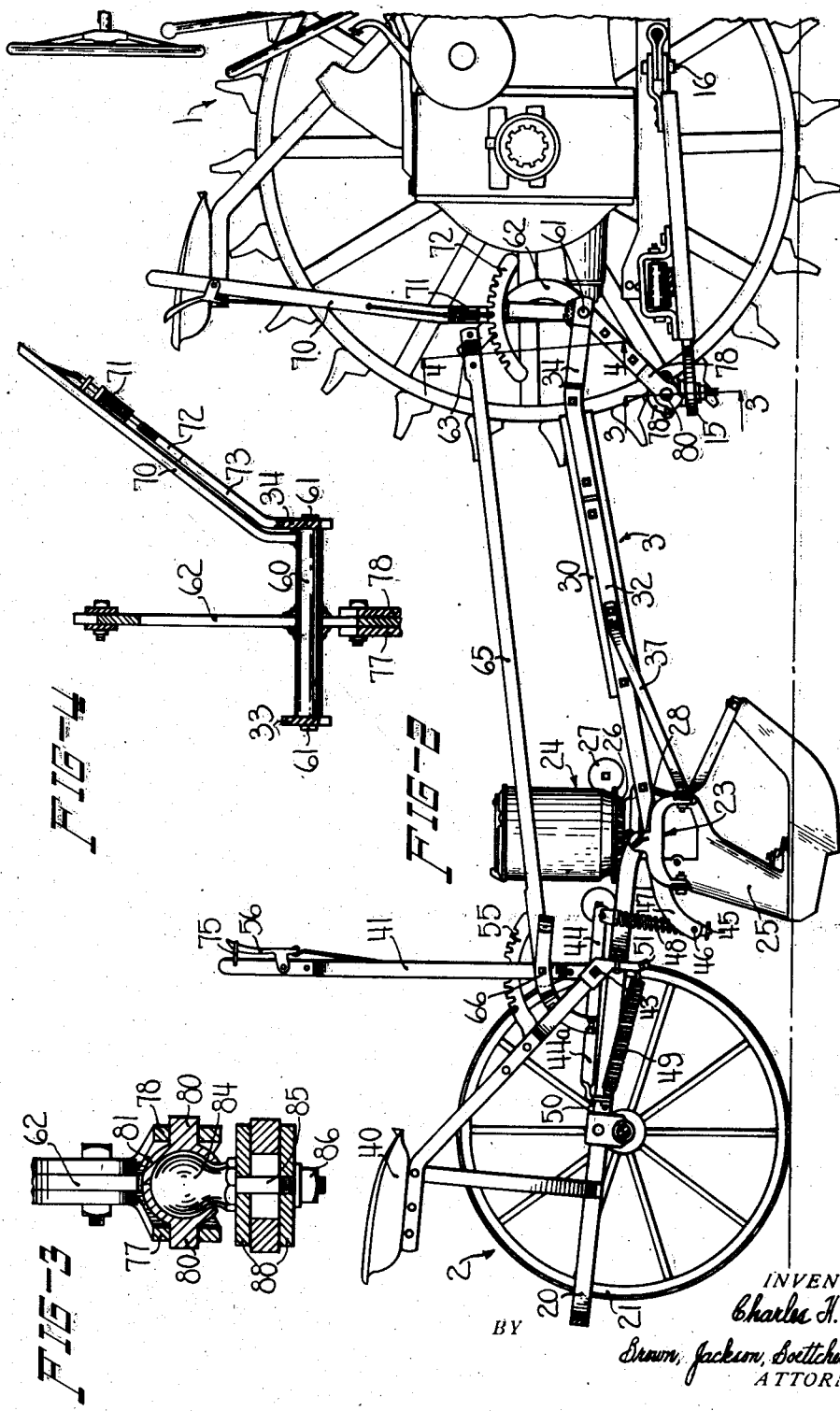

Patented Feb. 8, 1938

2,107,723

UNITED STATES PATENT OFFICE 2,107,723

PLANTER

Charles H. White, Moline, Ill., assignor to Deere & Company, Moline, Ill., a corporation of Illinois Application October 25, 1935, Serial No. 46,639

19 Claims. (Cl. 97—47)

The present invention relates generally to agricultural machines such as planters and other machines including implements having ground working tool means, the depth of operation of which can be controlled and in which the tool means is raised when turning at the end of the field, the raising and lowering or depth adjusting preferably being controlled by the operator on the propelling unit.

The principal object of the present invention is the provision of an agricultural machine having improved hitch mechanism connecting the implement unit with the propelling unit so as to provide a machine in which the depth of operation and the raising and lowering of the ground working tool means can be easily and conveniently controlled by a simple adjusting mechanism. More specifically, an object of the present invention is the adaptation of a horse-drawn agricultural implement, having depth adjusting or raising and lowering means normally actuable from a position on the implement, for use in an agricultural machine in which the implement unit is drawn by a tractor or other source of draft. An additional object of the present invention is the provision of suitable adjusting mechanism adapted to be mounted on and controlled from the tractor and so connected with the implement adjusting mechanism as to operate the latter in a simple and convenient manner.

Another object of the present invention is the provision of an agricultural machine embodying new and improved hitch mechanism between the implement and the propelling unit, such as a tractor, so constructed and arranged that the implement unit is permitted to recede from the propelling tractor as the tools are being raised, thereby utilizing the draft force to assist in raising the tools. Another object of the present invention in this connection is the provision of hitch mechanism so constructed and arranged that when the tools are lowered into their working position, the implement is at the same time shifted forwardly through a limited distance. This facilitates bringing the ground working tool down to its proper working depth with a cutting or slicing action before the machine as a whole is started up. By virtue of these particular features, a simple hand operated control mechanism is provided and one which secures the desired adjustment without requiring either undue exertion on the part of the operator or more or less complicated connections with a power take-off unit, but of course either hand- or power-operated adjustment is contemplated.

Still further, another object of the present invention is the arrangement of the hitch mechanism so that the ground engaging tools are raised with a parallel lifting movement so as to secure a proper position of the tools at all operating depths.

These and other objects and advantages of the present invention will be apparent to those skilled in the art after a consideration of the following detailed description of the preferred structural embodiment, taken in conjunction with the accompanying drawings illustrating such embodiment.

In the drawings:—

Figure 1 is a plan view of the major portions of an agricultural machine embodying the principles of the present invention;

Figure 2 is a side view of the machine shown in Figure 1, the near supporting wheels of the implement and traction units being removed;

Figure 3 is a section taken along the line 3—3; and

Figure 4 is a section taken along the line 4—4 of Figure 2.

The agricultural machine which has been illustrated as embodying the principles of the present invention comprises a propelling unit or source of draft in the form of a tractor 1, a planting implement 2 and a suitable hitch mechanism 3 by which the draft of the propelling unit 1 is transmitted to the implement unit 2. The tractor 1, only a part of which is shown in the drawings, is of a conventional construction, embodying a source of power enclosed in a suitable casing 5 to which laterally directed extensions 6 and 7 are secured and which enclose the driving axles 8 and 9. Rear traction wheels 10 and 11 are adjustably secured in fixed relation onto the axles 8 and 9, and the tractor 1 also includes a laterally swingable draw bar 15 pivotally connected, as at 16, at its forward end to the tractor and supported, where necessary, for lateral movement upon a transverse member 17, which is more or less conventional practice.

The implement unit 2 comprises a check row planter of the two-row horse drawn type, but the present invention in its broader aspects is not to be limited to an implement or ground working unit of this particular type. The planter 2 includes a rear or main frame 20 supported by wheels 21 mounted on an axle 22 about which the frame as a whole tilts. The planting or seed selecting and depositing mechanism of the planter unit 2 includes a runner frame 23 disposed in transverse relation with respect to the line of advance and carrying a pair of seed containers 24. The seed selecting and depositing mechanism includes a runner or furrow opener 25 for each of the seed containers, the latter being rigidly connected to the runner frame 23. Each of the planting units includes seed depositing means 26 and controlling check heads 27, and the runner frame 23 carrying the units and the runners or furrow openers 25 are hingedly connected, as at 28, with the forward ends 20a and 20b (Figure 1) of the bars constituting the planter frame 20.

The hitch connection between the planting unit 2 and the tractor 1 comprises a draft member in the form of a pole 30 provided on each side thereof with longitudinally extending bars 31 and 32, the latter extending forwardly and terminating in apertured laterally spaced arm sections 33 and 34, and the rear ends of the bars 31 and 32 are rigidly connected with the transverse bars constituting the runner frame 23. Suitable braces 36 and 37 are connected between the forward runner frame bar and the longitudinal pole bars 31 and 32, being bolted or otherwise secured thereto, as at 38 and 39, respectively.

So far as has been described, the planter unit 2 is more or less of conventional construction, being a unit of the horse drawn type in which the rear end of the tongue or pole, corresponding to the member 30, is rigidly fastened to the runner frame and is supported at its forward end on a neck yoke carried by the draft animals. In such an arrangement where the main frame is pivoted, as at 28, to the runner frame, the raising and lowering of the runners 25 into and out of ground engaging or furrow opening position is effected in any suitable manner, usually by means of a hand lever accessible to the operator on the planter seat 40 and arranged to tilt the main frame 20 of the planter and the runner frame upwardly by a connection with the rear end of the tongue or pole or the rear section of the runner frame rigidly secured thereto. In the present construction, a hand lever 41 is disposed opposite the operator's seat 40 and is pivoted to the rear or main frame 20 of the planter by a pivot bolt 43 (Figure 2) or the like. The hand lever 41 carries a forwardly extending arm 44 and is connected with the runner frame 23 by means of a link 45 slidably and pivotally connected, as at 46, to the rear end of an arm 47 forming a rigid part of the runner frame 23. A spring 48 is connected between the arms 45 and 47 to yieldingly urge the runners 25 into the ground, but the spring 48 is adapted to yield if one or both of the runners should strike an obstruction. An assisting lifting spring 49 extends between a bracket 50 carried at the rearwardly extended end 44a of the arm 44 and, at its forward end, is connected with a bracket 51 fixed to the main frame 20 in any suitable manner. The hand adjusting lever 41 carries the usual latching dog adapted to engage in a notched quadrant 55, the latching dog being releasable by means of the usual latch release lever 56. As in conventional horse drawn planters, whenever the adjusting and raising lever 41 is swung rearwardly, the runner frame 23 is raised, together with the rear end of the pole or tongue, which in that case pivots around its forward support on the neck yoke, thereby raising the runners out of ground engaging position and arranging the planter for transport or for turning around at one end of the field.

In utilizing this type of unit, thereby providing for the easy conversion of a horse drawn unit to a tractor propelled unit, the present invention provides the relatively short pole 30 and the laterally spaced arm portions 33 or 34, mentioned above. A transverse sleeve 60 is carried by pivot means 61 on said arm portions, being disposed therebetween as indicated in Figure 4, and a bell crank lever member 62 is rigidly secured, as by welding, to the sleeve member 60. The upper end of the bell crank 62 is pivotally connected, as at 63, with the forward end of a longitudinally disposed link 65, the rear end of which is pivotally connected, as at 66, with the planter adjusting lever 41. A forward adjusting lever 70, which also extends laterally as best indicated in Figure 4, is rigidly secured to the sleeve 60 adjacent one end thereof, as by welding, and carries the usual form of latch mechanism 71 which cooperates with a notched sector 72 welded to the upper end of a short bar 73, the lower end of which is similarly secured to one of the pole arms, preferably the arm 34. Since the lever 70 is welded to the sleeve, when the latch mechanism 71 is engaged in one of the notches of the sector 72, the angular position of the lever member 62 is fixed, and similarly the angular position of the planter adjusting lever 41 is also fixed. Thus, by actuation of the lever the planter adjusting lever 41 is actuated and the depth of operation and the raising and lowering of the runners or furrow openers 25 effected. A ring 75 acts in this case through the latch lever 56 to hold the associated latching dog out of engagement with the notched sector 55.

The draft is applied to the hitch mechanism at the lower end of the lever or bell crank member 62. As best shown in Figure 2, the lower arm of the lever 62 extends downwardly and rearwardly and is provided at its lower end with arms 77 and 78 which engage the trunnions 80 of a socket member 81 in which a ball 84 is disposed. The ball 84 includes a shank 85 which is threaded to receive a nut 86 and passes through a pair of apertured plates 88 on opposite sides of the draw bar 15, and when the nut 86 is tightened the ball 84 is rigidly fastened to the rear end of the draw bar 15. By this means, a flexible connection between the tractor 1 and the implement 2 drawn thereby is provided.

Figure 2 illustrates the normal operating position of the machine, the runners 25 operating at the desired depth, depending upon the adjustment of the lever 70, the planter wheels 21 driving the seed selecting mechanism 26 by which the seed is deposited at the desired intervals. When the operator comes to the end of the row and while the tractor is still moving forwardly, it is customary to raise the planter into inoperative position and then turn the tractor around to start back again preparatory to planting the next rows. The connections with the draft lever mechanism 62 are so arranged that when the lever 70 is pulled rearwardly to raise the runners 25 out of the ground, the planter 2 is allowed to recede with respect to the tractor 1, due to the fact that it is connected to the tractor through the bell crank member 62 so that the pivot 61 is above the pivot 80 and moves rearwardly relative to the tractor. By reason of this arrangement, the draft of the tractor or the drag of the planter is taken advantage of to facilitate raising the runners or furrow openers 25 to transport position.

After the planter has been turned around at the end of the field, preparatory to planting the next two rows, the tractor is stopped and, since the planter unit 2 is of the check wire actuated type, the operator makes the necessary rearrangement of the check wire and then again takes his position on the tractor and lowers the planter to operating position while the tractor is still stationary, by moving the lever 70 and the bell crank member 62 forwardly. This shifts the planter 2 forwardly through substantially the same extent that it was in the first instance permitted to recede in the raising operation. While this amount of shift is not great, it is sufficient to materially facilitate bringing the planter runners down to their proper working depth immediately, and before the machine is started down the rows, since the runners are pushed into the ground with the cutting or slicing action. If the planter runners were merely lowered vertically or onto the ground surface, it would be rather difficult to force the runners down to their proper operating depth until after the machine started moving. Thus, according to the present invention, the planting at the ends of the rows is controlled with just the same preciseness and accuracy as at any other part of the field.

In view of the fact that the draft or hitch connection 3 is connected to the bell crank member 62 at a point forwardly of and above the point of connection 80 of the member 62 with the tractor, the movement of the lever 70 in raising and lowering the runners 25 also raises and lowers the front end of the pole 30 through substantially the same vertical distance. This is due to the particular arrangement in which the points 63 and 66, at which the link 65 is connected with the member 62 and the adjusting lever 41, respectively, taken in conjunction with the points 61 and 46, the point of connection of the pole 30 with the bell crank lever 62 and the connection between the lifting links 45 and the associated runner arms 47, form a parallelogram, and the planter runners move with substantially parallel movement as the lever 70 is adjusted fore and aft. This is a desirable characteristic, especially within the operating or ground working range of adjustment of the runners, since thereby the proper position of the runners is maintained at all operating depths. The accuracy of spacing is therefore not effected by any change or adjustment in the operating depth of the tools 25.

While I have shown and described above the preferred structure in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:—

1. An agricultural machine comprising a source of draft, a draft lever pivotally connected at one end with said source of draft, an agricultural implement adapted to be propelled by the source of draft and including a ground engaging tool shiftable into and out of ground engaging position, draft transmitting means extending from said lever at a point spaced from its pivotal connection with the source of draft to said implement, and means operatively connected with said lever at a point spaced from said last mentioned means and also connected with said implement so as to change the position of said ground engaging tool means and simultaneously shift the implement fore and aft relative to said source of draft.

2. An agricultural machine comprising, in combination, a source of draft including a draw bar, a generally vertically arranged lever mounted at its lower end for swivelling movement on said draw bar, an implement swingable laterally relative to said draft source about said swivel axis and having a soil engaging tool adapted to be raised and lowered into and out of transport position, means connecting said implement with said lever at a point above the pivotal connection of the latter with said draw bar, whereby fore and aft swinging movement of the lever occasions fore and aft shifting of the implement relative to the source of draft, and means operated by the swinging of said lever for raising and lowering said tool means relative to said implement.

3. An agricultural machine comprising, in combination, a tractor, a lever pivotally mounted thereon, an agricultural implement having tool means adapted to be raised and lowered, means pivotally connected at its rear end with said implement and at its forward end with said lever at a point spaced from the pivot of the latter so that when said lever is swung in one direction the implement recedes with respect to the tractor and is advanced with respect thereto when the lever is swung in the other direction, and means for rocking said implement about its pivotal connection with the rear end of said last named means when said lever is actuated, whereby the tool means is lowered when said lever is swung to advance the implement with respect to the tractor.

4. An agricultural machine comprising, in combination, a source of draft, an adjusting lever pivotally mounted on said source of draft and shiftable generally fore and aft, an implement adapted to be propelled by said source of draft and including a generally vertically movable frame, tool means connected therewith, and a draft member pivotally connected with the forward portion of said implement frame and with the adjusting lever carried by said draft source at a point spaced from the pivotal connection thereof so that as said lever is adjusted fore and aft the forward point of connection of said draft means is shifted vertically, and link and lever means connected with said adjusting lever on said implement frame so as to raise and lower said tool means approximately the same extent as the forward end of said draft member is raised and lowered by movement of said adjusting lever.

5. An agricultural machine comprising, in combination, a source of draft, an adjusting lever pivotally carried thereby and swingable fore and aft, implement means including a generally vertically adjustable frame, a draft member pivotally connected at its rear end to said frame and at its forward end to a point on said adjusting lever which moves generally vertically as said lever is adjusted fore and aft, means for fixing said lever against swinging under the influence of the draft, implement tool means rigidly connected with said draft member, bell crank means supported on said implement frame, and link means connecting the arms of said bell crank means with said tool means and said lever so that as the latter is adjusted both the front and rear ends of said draft means move vertically through substantially the same extent.

6. The combination with a tractor, of an implement comprising a wheel-supported frame, a draft frame pivotally connected to the front of the wheel-supported frame, ground working tools carried by the draft frame at the rear end thereof, lifting means on the wheel-supported frame and connected with the draft frame for raising and lowering the rear end of the latter, means connecting the front end of the draft frame with the tractor including a second lifting means for raising the front end of the draft frame relative to the tractor, and a connection between the lifting means on the wheel-supported frame and the second lifting means for causing actuation of the lifting means on the wheel-supported frame whenever said second lifting means is actuated.

7. The combination with a tractor, of a wheel-supported frame, a draft frame pivotally connected to the wheel-supported frame, ground working tools carried by the draft frame at the rear end thereof, lifting means on the wheel-supported frame for raising and lowering the rear end of the draft frame, a lever pivotally connected intermediate its ends to the draft frame, means for connecting one end of said lever to the tractor, means for locking said lever in different angular positions with respect to said draft member, and means connecting the opposite end of said lever with said lifting means whereby the actuation of said lever operates said lifting means.

8. The combination with a tractor, of a wheel-supported frame, a draft frame pivotally connected to the wheel-supported frame, ground working tools carried by the draft frame at the rear end thereof, lifting means on the wheel-supported frame for raising and lowering the rear end of the draft frame, a lever pivotally connected to the front end of said draft member and having a downwardly and rearwardly extending arm, means for pivotally connecting the lower end of said arm to the tractor, means for adjusting said lever to different angular positions with respect to said draft member to raise and lower the front end of said draft member relative to the tractor, and a connection between said lever and said lifting means, whereby the latter is operated whenever said lever is actuated.

9. The combination with a tractor, of an implement comprising a wheel supported frame, a draft frame pivotally connected to the front of the wheel-supported frame, ground working tools carried by the draft frame at the rear end thereof, lifting means on the wheel-supported frame and connected with the draft frame for raising and lowering the rear end of the latter, means connecting the front end of the draft frame with the tractor including auxiliary lifting means connected to the lifting means on the wheel supported frame for actuating said first lifting means, and a connection between said auxiliary lifting means and the draft frame for causing relative fore and aft movement between the draft frame and the tractor whenever said auxiliary lifting means is actuated, whereby the force of the draft is utilized to aid in lifting the rear end of the draft frame and the tools carried thereby.

10. An implement comprising a wheel-supported frame, a tool connected with said frame for raising and lowering movement with respect to said frame, lifting means on the frame for raising and lowering said tool, a draft member for the implement, a lifting lever pivoted to the front end of said draft member and connected with said lifting means to actuate the latter, and means on said lever spaced from the point of pivotal connection of said lever with said draft member for pivotally connecting it to a pulling vehicle.

11. The combination with a tractor, of a wheel-supported frame, a draft frame pivotally connected to the wheel-supported frame adjacent the forward portion of the latter, ground working means carried by the draft frame at the rear end thereof, means connected with the forward portion of said wheel-supported frame and the rear portion of said draft frame for swinging the same to raise and lower said ground working means, a lever pivotally connected to the front end of said draft member and having a downwardly extending arm, means for pivotally connecting the lower end of said arm to the tractor, means for adjusting said lever to different angular positions with respect to said draft member to raise and lower the front end of said draft member relative to the tractor, and a connection between said lever and said raising and lowering means.

12. An implement comprising a wheel supported frame, a tool connected with said frame for raising and lowering movement with respect to said frame, lifting means on the frame for raising and lowering said tool, a draft member for the implement, hitch means for connecting said draft member with a tractor including a lifting lever connecting with said lifting means for operating the latter, and a connection between said lever and said draft member for causing said draft member to move fore and aft relative to said hitch means when said lifting lever is actuated.

13. Hitch mechanism for connecting a tractor and an implement having tool means adapted to be raised and lowered, said mechanism comprising a draft member adapted to be operatively connected at its rear end with said implement and including at its forward end two laterally spaced arms, a generally vertically disposed lever member adapted to be pivotally connected at its lower end with said tractor and including a generally transversely disposed sleeve, pivot means connecting said laterally spaced arms with said lever member and carried by said sleeve, adjustable mechanism including a part carried by said draft member for holding said lever member in adjusted position, and means connected with the upper end of said lever member for raising and lowering said tool means when said lever member is operated.

14. Hitch mechanism adapted to connect a tractor having a draw bar and an implement having tool means and means for raising and lowering the same, said hitch mechanism comprising a lever member having a swivel mounting on said tractor drawbar and including a portion extending upwardly and forwardly therefrom, transverse hitch receiving means carried by said portion of the lever member, a draft bar connected at its rear end to said implement and at its forward end to said hitch receiving means, whereby when said lever member is swung about said swivel mounting, the implement is shifted fore and aft with respect to the tractor, and means including a link pivotally connected at its forward end with said lever member and associated with said implement raising and lowering means whereby, when said lever member is swung rearwardly to raise the forward end of said draft bar to cause said implement to recede with respect to the tractor, the tool means of said implement is raised.

15. A hitch connection for a tractor comprising a lever pivotally connected with the tractor, a draft member pivotally connected to said lever at a point spaced from the pivot connection of the latter with the tractor so as to impose all of the draft of said member on said lever, means serving as a sector rigidly connected with said draft member, and latch means carried by said lever member and cooperating with said sector for retaining said lever member in the desired position relative to the tractor.

16. A planter comprising a wheel-supported planter frame, a runner frame pivoted to said planter frame, a draft bar rigidly fastened to said planter frame, means reacting against the latter and connected with said runner frame for raising and lowering the latter, a draft lever having one end adapted to be connected with the source of draft and pivotally connected to the forward end of said draft member for the purpose of transmitting draft through the latter to said planter frame, and means operatively connecting said draft lever with said raising and lowering means for operating the latter by said draft lever.

17. A planter comprising a wheel-supported planter frame, a runner frame pivotally connected thereto adjacent its forward end, a hitch member rigidly fastened to said runner frame and extending rearwardly thereof, mechanism carried on said planter frame and acting against the rear end of said hitch member for raising and lowering the runner frame, the opposite end of said hitch member extending forwardly and being adapted to receive the draft, and a lever pivoted adjacent the forward end of said hitch member and operatively connected with said raising and lowering mechanism.

18. A planter comprising a wheel-supported planter frame, a runner frame pivotally connected thereto adjacent its forward end, a hitch member rigidly fastened to said runner frame and extending forwardly thereof, mechanism for raising and lowering the runner frame, and means including a lever pivoted adjacent the forward end of said hitch member for operating said raising and lowering mechanism.

19. Hitch mechanism adapted to connect a trailing implement to a tractor, comprising a draft member connected at its forward end with the tractor and at its rear end with said implement, a lever pivotally connected with the forward end of said draft member and adapted to be releasably latched against movement with respect thereto, and rearwardly extending link means connected at its forward end with said lever and reacting at its rear end against said trailing implement for adjusting the position of the latter relative to the rear end of said draft member.

CHARLES H. WHITE.